Oct. 14, 1952  J. H. FRIEDMAN  2,613,776
FEED CLUTCH FOR COLD HEADERS
Filed April 8, 1946  5 Sheets-Sheet 1

INVENTOR.
JOHN H. FRIEDMAN
BY Richey & Watts
ATTORNEYS

INVENTOR.
JOHN H. FRIEDMAN
BY Richey & Watts
ATTORNEYS

Oct. 14, 1952     J. H. FRIEDMAN     2,613,776
FEED CLUTCH FOR COLD HEADERS
Filed April 8, 1946                                           5 Sheets-Sheet 4

INVENTOR.
JOHN H. FRIEDMAN
BY Richey & Watts
ATTORNEYS

Oct. 14, 1952 J. H. FRIEDMAN 2,613,776
FEED CLUTCH FOR COLD HEADERS

Filed April 8, 1946 5 Sheets-Sheet 5

INVENTOR.
JOHN H. FRIEDMAN
BY Richey & Watts
ATTORNEYS

Patented Oct. 14, 1952

2,613,776

UNITED STATES PATENT OFFICE 2,613,776

FEED CLUTCH FOR COLD HEADERS

John H. Friedman, Tiffin, Ohio, assignor to The National Machinery Company, Tiffin, Ohio, a corporation of Ohio Application April 8, 1946, Serial No. 660,571

2 Claims. (Cl. 192—45)

This invention relates to stock feed mechanism for metal working machines, more particularly to an improved feed clutch for cold headers.

As an example of a type of machine which may employ my improved feed clutch, reference is made to Patent #1,856,028 issued April 26, 1932, to W. L. Clouse. Generally speaking, machines of this variety include a stationary die, a heading tool mounted on a header slide and movable toward and away from the die to effect the heading, a stock feed mechanism including an over-running clutch to feed the proper length blanks from rod or wire stock, shearing mechanism to shear off the blanks, and transfer mechanism for transferring the severed blanks into proper position relative to the die so that they may be headed by the blow of the heading tool.

The stock feed device to which this invention relates feeds the stock intermittently. Generally speaking, the devices of this class include a pair of feed rollers which grip and feed the stock and means to drive the rollers. The driven shaft is usually connected to a reciprocating mechanism by means of an overrunning clutch, the arrangement being that on the feed stroke of the reciprocating mechanism the clutch engages, which turns the rollers and feeds the stock, whereas on the return stroke the clutch automatically disengages and the feed rollers are not driven.

Prior stock feed devices of the type to which this invention relates have included a clutch hub member supported on the shaft which drives the feed rollers, and a clutch housing member supported on the same shaft and having an annular portion surrounding the hub member. One of these clutch members is formed with a non-circular peripheral surface, and a series of rollers lie between the two clutch members, the arrangement being such that the rollers lock the two members together in one direction and permit them to move relative to one another in the other direction. The driven clutch member is keyed to the shaft and the driving clutch member floats on the shaft.

This arrangement found in the prior art has proven unsatisfactory for several reasons. The clutch member which forms a casing about the rollers has in the past been supported at one edge only. This has resulted in distortion and canting of that member under the heavy loads encountered towards the end of the feeding stroke. That distortion or canting caused one or more of the rollers to become canted and the canted rollers tended to take the entire load of the feed drive. Thus as the machine was operated various individual rollers took loads which were meant to be distributed over the entire set of rollers, and as as result the rollers wore rapidly and in some cases they became fractured. It is an object of this invention to prevent distortion of the clutch parts and canting of the rollers by providing a clutch in which all parts are firmly supported, there being no overhanging portions subjected to heavy loads.

Another difficulty encountered with devices in the prior art arose from the fact that the clutch members were entirely supported by a portion of the roller drive shaft extending out from the machine frame. This placed severe bending stresses on the cantilever portion of the shaft and necessitated that the shaft be made excessively rigid in order that no relative displacement take place between the carefully fitted parts of the clutch. It is another object of this invention to relieve some of the load on the shaft by supporting parts of the clutch in the machine frame itself.

Prior clutch devices of the type to which this invention relates have included a non-circular driving member designed to cooperate with the circular clutch member to form a wedge-like pocket for the rollers. The non-circular member has been formed in a rather complicated shape and has required expensive and complex machining operations for its production. Furthermore, this member has been asymmetrical, so that it could not be reversed in order to distribute the wear. It is a further object of this invention to provide a symmetrical clutch member which is simple in design, which is readily machined, and which can be reversed to distribute the wear. This object is attained by making the clutch member in the shape of a regular polygon, the rollers being disposed between the center of each face and one corner thereof so that they lie in a wedge-like pocket. Other objects and advantages of my invention will become apparent to those skilled in the art as the following description proceeds.

Figure 1:
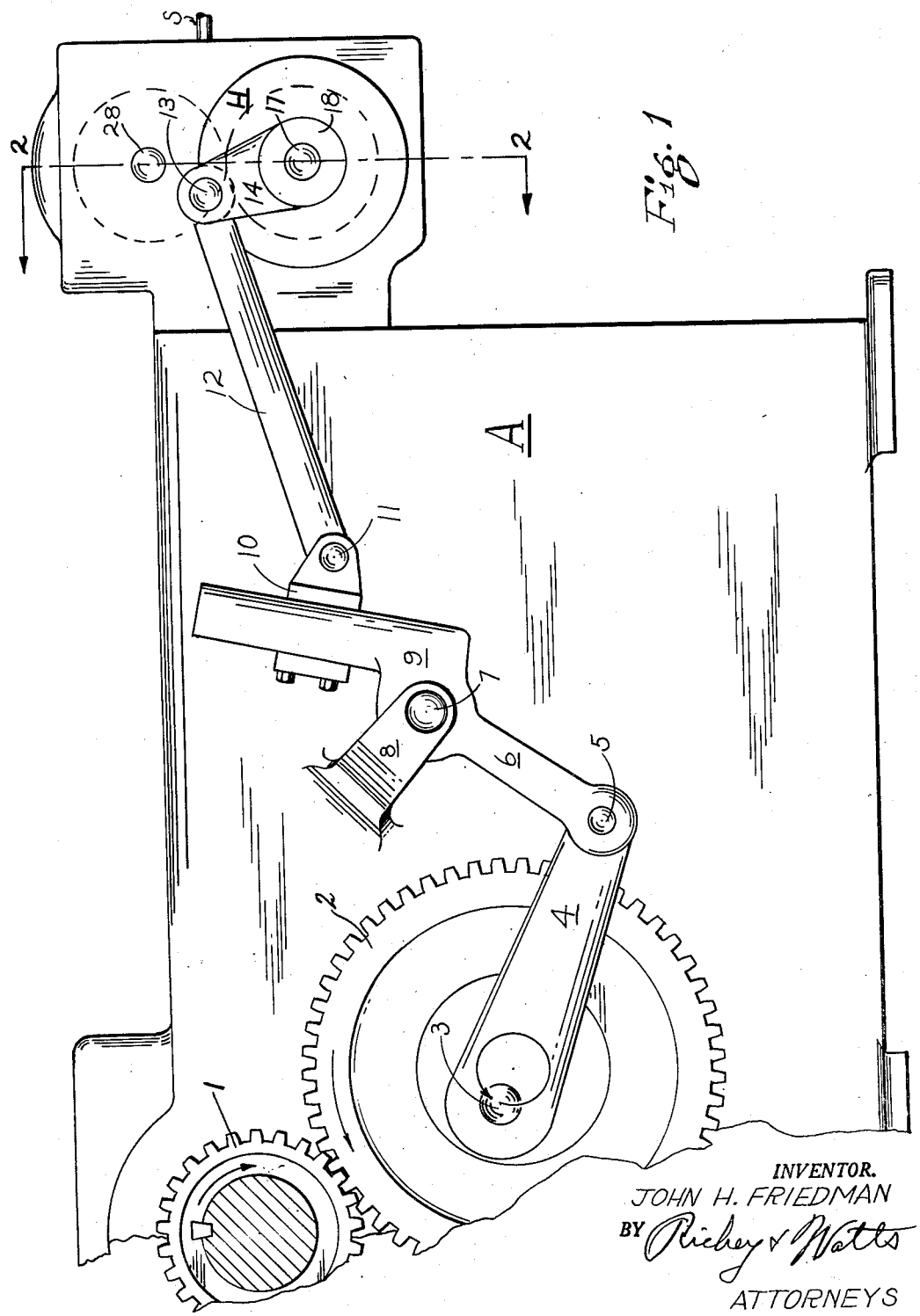
Fig. 1 is a side elevation of a cold header showing the driving linkages for the stock feed clutch.

Referring to the drawings, in Fig. 1 the machine frame A carries a feed mechanism housing B that supports the mechanism which feeds wire or bar stock S intermittently. The entire mechanism is driven by a driving pinion 1 the shaft of which is driven by the prime mover. Driving gear 2, driven by the pinion 1, is provided with a crank pin 3 which pin, in turn, causes a reciprocating motion of crank arm 4. Crank arm 4 is pivoted at 5 to a portion 6 of the feed driving lever, this lever being pivoted at 7 in the machine frame A. An outboard support 8 may be provided for the pivot pin 7 if desired. An upwardly extending portion 9 of the feed drive lever carries a block 10 which supports a pivot pin 11. Block 10 may be adjusted in any convenient manner on support 9, to provide the proper stroke. The feed drive rod 12 is pivoted at one end to pin 11, and at the other end by pin 13 to an arm 14 which latter arm forms part of the clutch housing H.

Figure 2:
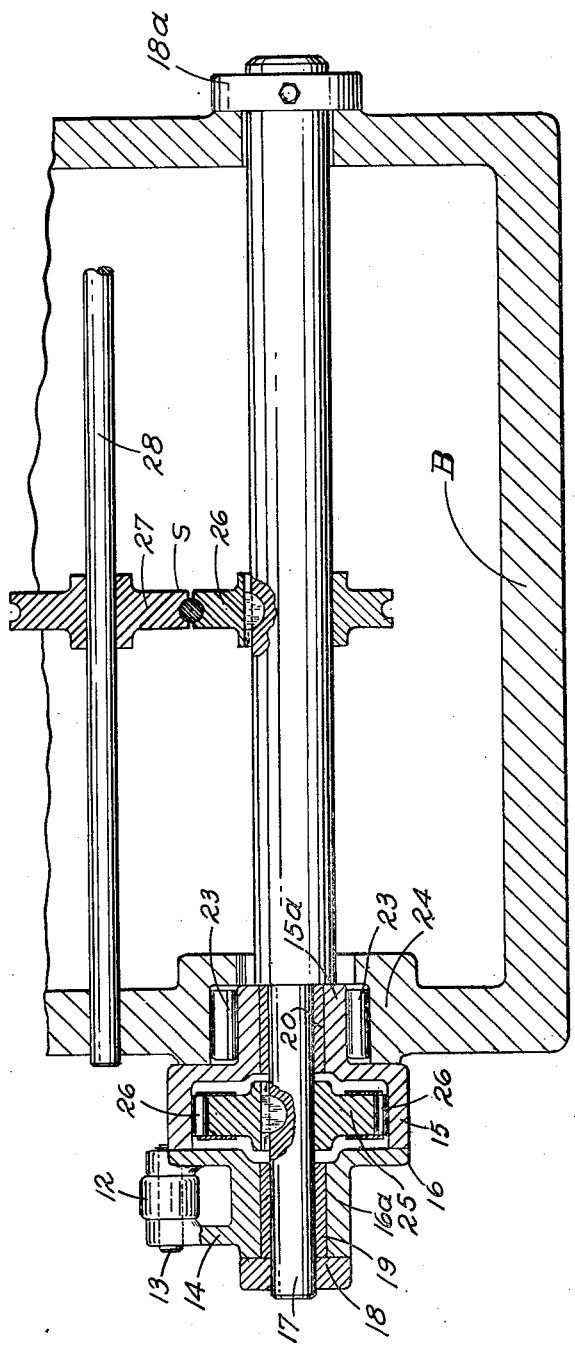
Fig. 2 is a sertion of the feeding portion of the header taken at 2—2 of Fig. 1, showing the clutch and feed rollers diagrammatically.

Referring to Fig. 2, the end of arm 12 can be seen pivoted on pin 13 which is carried by arm 14 of the clutch housing H. Clutch housing H is made up of two major sections, an axially inner section 15 and an outer section 16 connected thereto, the connection being such that in operation the two sections act as one. The clutch housing is supported on shaft 17 which shaft is mounted in the machine frame. A collar 18 retains the clutch housing on the shaft at one end and a collar such as that shown at 18a may be provided to retain the shaft in the frame at its other end.

Section 16 of the clutch housing has an axially outwardly extending portion 16a which is supported on shaft 17 by means of a sleeve bearing 19. Section 15 of the clutch housing has an axially inwardly extending sleeve portion 15a which is supported on shaft 17 by sleeve bearing 20. Sleeve portion 15a connects to radial wall portion 21 which, in turn, joins with an enlarged annular portion 22 to form a housing for the rollers.

Figure 3:
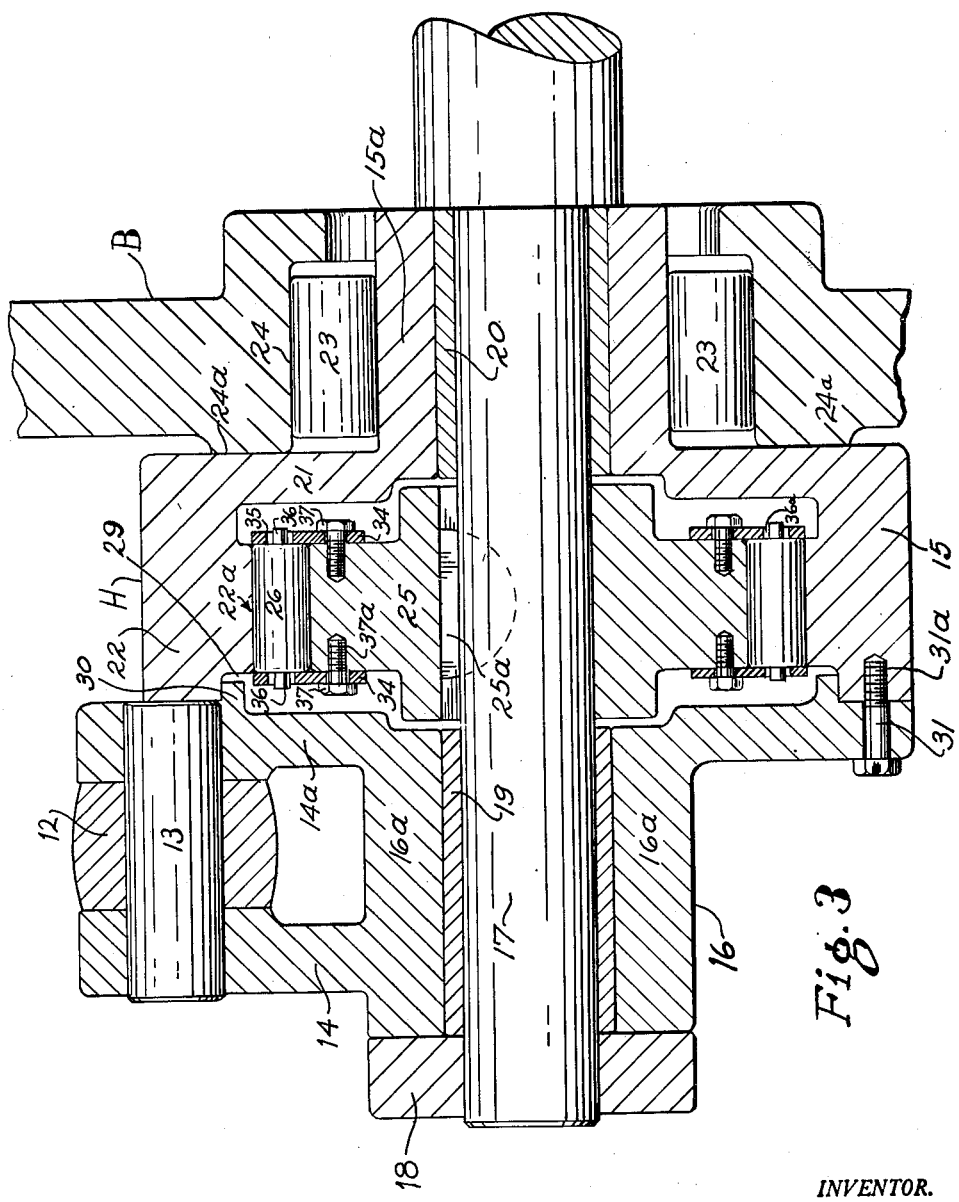
Fig. 3 is an enlarged cross-sectional view of the clutch mechanism.

The axially outer end of the portion 22 of section 15 of the clutch housing is formed with an annular recess 29 which recess receives a projection 30 formed on the wall 14a of the other clutch section 16. A series of bolts or other fastening means 31 threaded into threads 31a in section 15 of the housing join the clutch sections 15 and 16 together. In addition to being supported on shaft 17 by sleeve bearings 19 and 20, the clutch housing H is supported within the machine frame by means of rollers 23 which engage portion 15a of the clutch housing and which are carried by the outer race 24 formed in the machine frame. The assembly is prevented from motion to the right as seen in Fig. 3 by a thrust arrangement shown at 24a whereby a portion of the frame engages the wall 21 of the clutch housing. Of course, any standard form of thrust bearing may be provided at this point if so desired.

Within the chamber formed by the two sections lies the driven clutch member or hub 25 which is keyed to the shaft 17 by means of a key 25a in any conventional manner. A series of circumferentially spaced rollers 26 may be provided between hub 25 and the clutch housing as shown in Figs. 3 and 4, these rollers operating as ratchet members in a manner which will be described presently.

As can be seen in Fig. 2, within the feed housing B and mounted on shaft 17 is a driving feed roller 26 which in cooperation with another driven feed roller 27 supported on its associated shaft 28, grip and feed the stock S.

Figure 4:
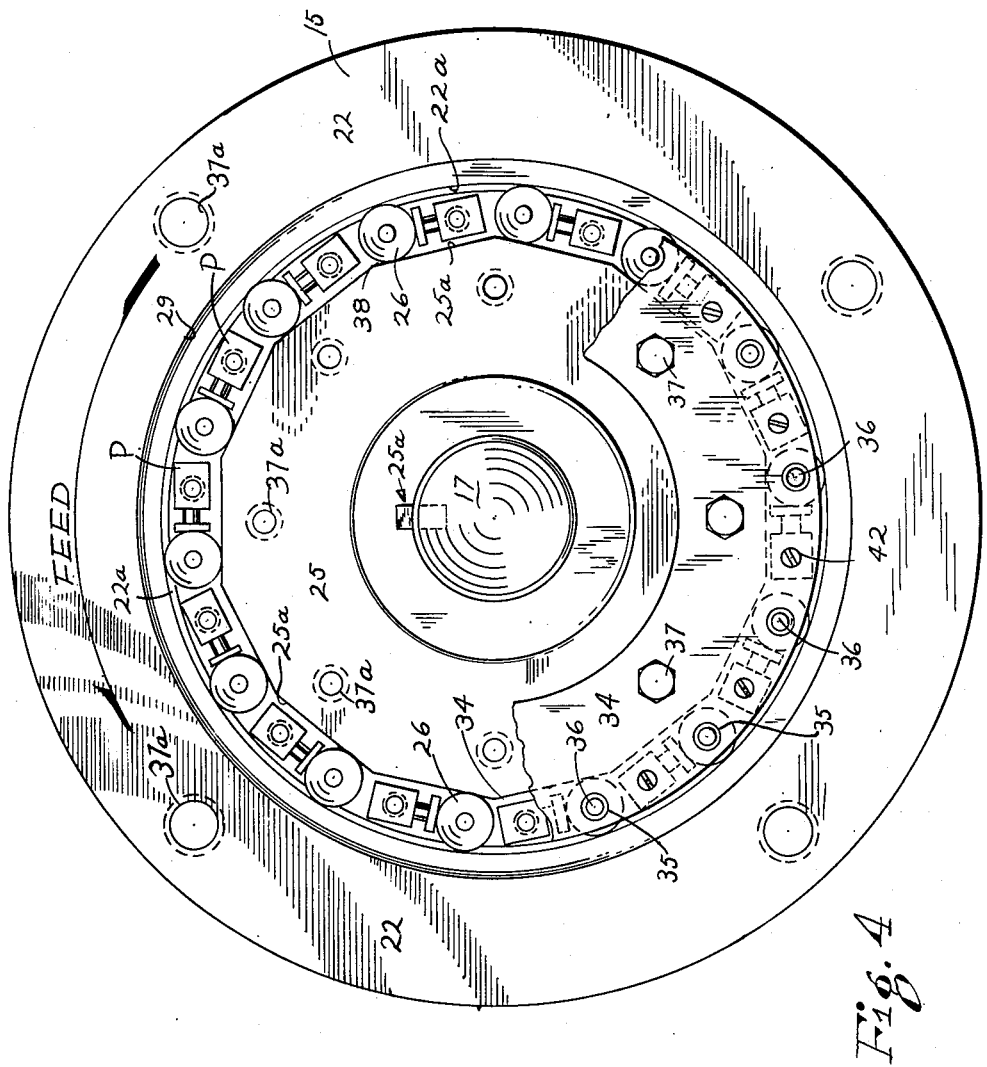
Fig. 4 is a side elevation of the clutch mechanism with the outer section of the clutch housing removed.

As can be seen in Figs. 3 and 4, the rollers 26 engage the inner surface of a race portion 22a formed on section 15 of the clutch housing, and they also engage the outer surface of the driven hub 25. The hub 25 is polygonal in shape as can be seen in Fig. 4 so that it has a series of peripheral surfaces 25a. Fourteen such surfaces are shown in the drawings but the number is not considered to be critical, the number of surfaces being largely dependent upon the diameter of the clutch and the load which it must carry. The rollers 26 are restrained axially by a pair of retaining rings 34 which are formed with apertures 35 to receive projections 36 integral with the roller 26. Apertures 35 are enough larger than the diameter of the projections 36 on the roller, to permit the limited circumferential motion of rollers required for proper operation of the clutch. The series of bolts or screws 37, in cooperation with tapped portions 37a on hub 25, serve to retain rings 34 in place.

Figure 6:
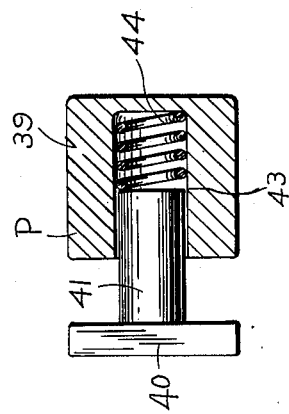
Fig. 6 is a partial section of the pressure plate arrangement, the roller supporting body being sectioned to show the spring.
Figure 5:
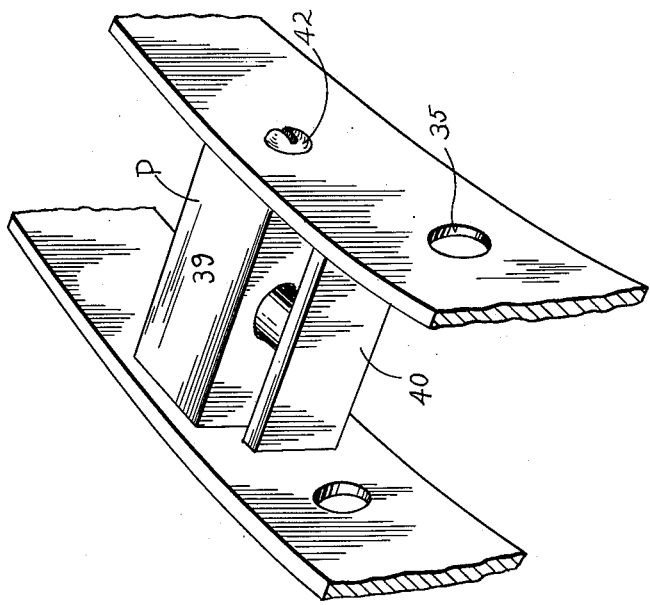
Fig. 5 is a perspective view of one form of pressure plate for the rollers.

As can be seen in Figs. 4, 5 and 6, a pressure plate unit P is provided for each roller. The pressure plate unit P includes a body and mounting block 39 and a pressure plate 40. The plate 40 is formed integral with a plunger 41, the entire assembly being mounted in the clutch by means of screws or other fastening devices as at 42. As seen in Fig. 6, block 39 is apertured as at 43 to receive plunger 41, which plunger is urged outwardly by a coil spring 44 or other equivalent device.

The operation of the clutch is as follows:

When the reciprocating mechanism is in that part of the cycle in which the arm 12 as seen in Fig 1 is moved to the left, the clutch housing rotates in its feeding direction indicated by the arrow in Figs. 1 and 4. When this occurs the clutch housing H tends to move relative to the hub 25, but since the pressure unit P has caused the rollers to engage the inner surface 22a of the clutch housing the rollers tend to roll with the housing H. As can be seen in Fig. 4, plane surface 25a in cooperation with the cylindrical surface 22a form a wedge-shaped pocket the depth of which decreases in the direction towards which the rollers tend to move on the feeding stroke. In this arrangement then, as the rollers tend to move with the clutch housing they become firmly wedged between that housing and the hub, and the clutch housing thereby drives both the rollers and the hub in the feeding direction. There is an imperceptible amount of relative motion in the feeding direction before the parts move together. On the return stroke the action just described is reversed for now the rollers tend to roll towards the wider portion of the wedge-shaped chamber, with which they unlock and permit independent motion of the clutch housing, the hub member 25 remaining stationary.

Having completed the description of the construction and operation of my improved feed clutch, it can be seen that my invention has several advantages over those in the prior art. As can be best seen in Fig. 3, the portion 22 of the clutch housing H which receives the radial thrust of the rollers, is supported at each end on bearings 19 and 20. Thus, no canting or distortion of the clutch housing under the powerful wedging action of the rollers is possible, and if the parts are properly made, each roller will take its share of the load and will continue to do so even under the relatively heavy conditions of loading encountered in this type of machine. Likewise, it will be seen that the support offered by rollers 23 within the frame of the machine relieves the shaft of a great deal of the load to which it would otherwise be subjected. This provides a very rigid and long-wearing construction and largely eliminates all distortion or binding of the parts which might result from flexing of the protruding portion of the shaft. Also, the supporting arrangement for the clutch housing used in my invention provides a substantially perfect dirt and dust seal for the highly finished rollers and clutch surfaces.

As can be seen in Fig. 4, my inner clutch member 25 may be formed as a regular polygon. This arrangement represents a great improvement over the tortuous and complicated shaped members formerly employed for the same purpose. First of all, being a regular polygon, with plane surfaces and no pockets or curved portions, the machine can be readily manufactured by standard shop equipment and indexing tools. Another advantage of the shape employed in my invention is that the hub member is symmetrical and if it becomes worn in the area engaged by the rollers it can be taken off and reversed, in which case the area adjacent the other corner of each surface 25a carries the load. Because of the symmetrical construction of the regular polygon, this reversal of the hub has no effect upon the direction in which the clutch will feed or upon its operation.

Those skilled in the art will appreciate that details of the construction illustrated in the figures can be modified. For example, the nature of the various bearings shown may be modified in accordance with standard practice, either antifriction or plain bearings being usable according to the design and loads to be carried. Likewise, it would be possible to make the clutch so that the hub is formed with a cylindrical surface and the polygonal surface is formed in the clutch housing, this being a mere reversal of parts. Also, the hub could be made integral with the shaft. The details of the pressure plate construction can be modified without affecting the operation of the clutch, all that is needed is an arrangement whereby a steady pressure against the rollers is provided. In place of extensions 36 on the rollers and apertures 35 in the retaining rings an extension could be formed on the retaining ring to enter an aperture in the roller. Portion 22a which forms an outer race for the rollers, could be made as a separately machined and hardened ring in accordance with standard machine design practice. Instead of rollers, other forms of ratchet members could be used without modifying the action of the housing in solidly supporting the assembly and the term ratchet members as used in the specification and claims is intended to include rollers and other similar self-locking ratchet means. These and other modifications of a similar nature may be made without altering the basic operation of the clutch, and without departing from the spirit of the invention as defined in the appended claims.

Having thus described the present invention so that others skilled in the art may be able to understand and practice the same, I state that what I desire to secure by Letters Patent is defined in what is claimed.

What is claimed is:

1. In combination, a machine frame having a bore thereon, a driven shaft, an overrunning clutch for driving said shaft, said clutch comprising a first clutch member fastened to said shaft, a second clutch member having an annular portion surrounding said first clutch member, said annular portion being joined to a pair of oppositely extending axially apertured support portions, said support portions being journaled to said shaft, said second clutch member also being journaled within said bore in said machine frame, a series of ratchet members disposed between said first and second members, and crank means on said second clutch member for connection to an associated mechanism.

2. In combination, a machine frame, a bore formed in said frame, a driven shaft extending through said bore, an overrunning clutch driving said shaft, said clutch comprising a driven member fastened to said shaft and having a driving surface, said driving member having an annular portion surrounding said driven member and spaced therefrom, said annular portion being joined to a pair of oppositely extending axially apertured support portions, said support portions being journaled to said shaft, one of said support portions being journaled within the bore in said machine frame, and a series of ratchet members disposed between said driving and driven members.

JOHN H. FRIEDMAN.

REFERENCES CITED

The following references are of record in the file of this patent:

UNITED STATES PATENTS

| Number | Name | Date |
|---|---|---|
| 1,142,574 | Huck | June 8, 1915 |
| 1,309,749 | Wilcox | July 15, 1919 |
| 1,687,524 | Smith | Oct. 16, 1928 |
| 1,820,151 | Mullen | Aug. 25, 1931 |
| 1,856,028 | Clouse | Apr. 26, 1932 |
| 2,292,988 | Bloomfield et al. | Aug. 11, 1942 |
| 2,371,653 | Schuckers | Mar. 20, 1945 |